United States Patent
Gerty et al.

(10) Patent No.: US 9,957,941 B1
(45) Date of Patent: May 1, 2018

(54) INTERMITTENT RESTART FOR AUTOMATIC ENGINE STOP START SYSTEM

(71) Applicants: Michael D. Gerty, Bellingham, WA (US); Uday Vadlamani, Bothell, WA (US); Jordan Mosher, Woodinville, WA (US); Sundeep S. Tuteja, Everett, WA (US)

(72) Inventors: Michael D. Gerty, Bellingham, WA (US); Uday Vadlamani, Bothell, WA (US); Jordan Mosher, Woodinville, WA (US); Sundeep S. Tuteja, Everett, WA (US)

(73) Assignee: PACCAR Inc, Bellevue, WA (US)

( * ) Notice: Subject to any disclaimer, the term of this patent is extended or adjusted under 35 U.S.C. 154(b) by 0 days. days.

(21) Appl. No.: 15/341,320

(22) Filed: Nov. 2, 2016

(51) Int. Cl.
*F02N 11/08* (2006.01)
*F02D 41/04* (2006.01)

(52) U.S. Cl.
CPC ........ *F02N 11/0822* (2013.01); *F02D 41/042* (2013.01); *F02N 2200/022* (2013.01)

(58) Field of Classification Search
CPC ................. F02N 11/08; F02N 11/0822; F02N 2200/022; F02D 41/04; F02D 41/042; F02D 41/00
See application file for complete search history.

(56) References Cited

U.S. PATENT DOCUMENTS 6,763,903 B2    7/2004   Morimoto et al.
8,419,592 B2 *   4/2013   Fujiwara ............. F02N 11/0844
                                                                                        477/167

FOREIGN PATENT DOCUMENTS

EP         2 410 158 A1    1/2012
EP         2 420 663 A1    2/2012
WO     2016/014396 A1    1/2016

* cited by examiner

*Primary Examiner* — Hieu T Vo
(74) *Attorney, Agent, or Firm* — Christensen O'Connor Johnson Kindness PLLC

(57) ABSTRACT

A disclosed method of automatically stopping and restarting a vehicle engine determines if one or more stop/start enablement condition has been met. If the stop/start enablement condition or conditions have been met, the method initiates an engine shutdown. If a restart request is made before the engine comes to a complete stop, an intermittent engine restart is initiated.

19 Claims, 5 Drawing Sheets

INTERMITTENT RESTART FOR AUTOMATIC ENGINE STOP START SYSTEM

BACKGROUND

Manufacturers and operators of vehicles are constantly seeking to improve the fuel efficiency of their vehicles. For vehicles that utilize internal combustion engine, increasing fuel efficiency results in lower operating costs for the customer and increased vehicle range. Increased fuel efficiency can also reduce vehicle emissions.

One strategy for improving fuel efficiency is to reduce vehicle idle time. During normal operation, vehicles experience periods in which the vehicle is not moving, but the engine in idling. Idling conditions can occur when a vehicle is being operated in heavy traffic or as a result of traffic signals, such as stop signs, stop lights, railroad crossings, etc. In order to reduce vehicle idle time, various systems and methods have been developed to automatically (1) stop the engine when the vehicle is stationary and certain operating conditions are met and (2) restart the engine based on operator input and/or other operating conditions. By reducing the time during which the vehicle engine operates unnecessarily, fuel consumption is reduced, and vehicle fuel efficiency is increased. One system for reducing vehicle idle time is disclosed in PCT Patent Application Publication No. WO2016014396 A1, filed Jul. 20, 2015, the disclosure of which is incorporated herein by reference.

When known systems automatically stop the engine during an idle condition, the engine must come to a complete stop before the engine is restarted. That is, the engine speed ($V_{eng}$) must drop to 0 revolutions per minute (rpm), after which the vehicle starter is utilized to restart the engine in the same manner as under a normal starting operation. As a result, if the vehicle operator tries to move the vehicle before the engine speed has reached 0 rpm, there is a delay between the operator requesting a restart and the engine restart sequence beginning. In order to reduce operator frustration caused by this delay and to improve vehicle performance, the presently disclosed stop/start system reduces and/or eliminates this delay.

SUMMARY

In a representative embodiment of a disclosed method of automatically stopping and restarting a vehicle engine, it is determined if one or more stop/start enablement conditions has been met. If the stop/start enablement condition or conditions have been met, the method initiates an engine shutdown. If a restart request is made before the engine comes to a complete stop, an intermittent engine restart is initiated. If the engine speed is greater than a threshold engine speed, then the restart begins before the engine comes to a complete stop. If the engine speed is less than a threshold engine speed, then the restart is delayed until the engine comes to a complete stop.

Also disclosed is a representative embodiment of a system for automatically stopping and restarting a vehicle engine. They system includes a vehicle having an engine and an engine speed sensor configured to sense engine speed. A controller is configured to receive signals from the engine speed sensor and control delivery of fuel to the engine. Further, the controller is programmed to determine if a stop/start enablement condition has been met. The controller is also programmed to initiate an engine shutdown and to initiate an intermittent engine restart in response to a restart request made when engine speed>0.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

Prior to discussing the details of various aspects of the present disclosure, it should be understood that the following description includes sections that are presented largely in terms of logic and operations that may be performed by conventional electronic components. These electronic components may be grouped in a single location or distributed over a wide area, and can generally include processors, memory, storage devices, input/output circuitry, etc. It will be appreciated by one skilled in the art that the logic described herein may be implemented in a variety of configurations, including but not limited to, hardware, software, and combinations thereof. In circumstances were the components are distributed, the components are accessible to each other via communication links.

As will be appreciated by one skilled in the art, the specific routines described herein in the flowcharts may represent one or more of any number of processing strategies such as event-driven, interrupt-driven, multi-tasking, multi-threading, and the like. As such, various acts or functions illustrated may be performed in the sequence illustrated, in parallel, or in some cases omitted. Likewise, the order of processing is not necessarily required to achieve the features and advantages, but is provided for ease of illustration and description. Although not explicitly illustrated, one or more of the illustrated acts or functions may be repeatedly performed depending on the particular strategy being used.

Generally described, the present disclosure relates to a system and method for automatically stopping and then starting a vehicle engine. More specifically, the present relates to a system and method restarting a vehicle engine before the engine has come to a complete stop when certain conditions are present. Although systems and methods will be described with regard to an illustrative set of steps related to the stopping and then restarting a vehicle engine, one skilled in the relevant art will appreciate the disclosed embodiments are illustrative in nature and should not be construed as limiting.

Figure 1:
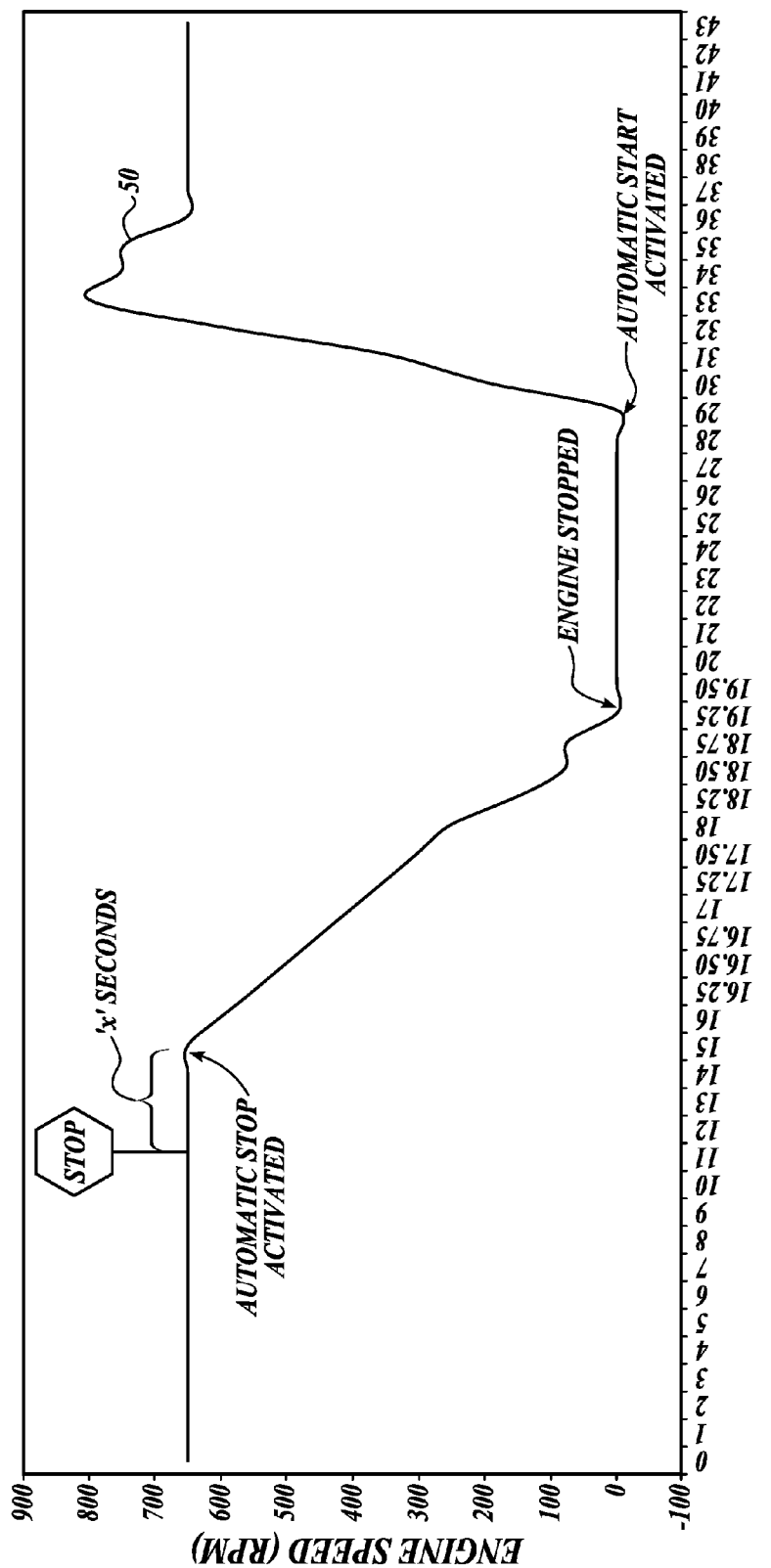
FIG. 1 shows a representative stop/start cycle of a known stop/start system.

FIG. 1 shows a stop/start cycle 50 according to one example of a known stop/start method. Specifically, FIG. 1 shows a plot of engine speed versus time during an exemplary stop/start cycle 50 of the stop/start method. During the initial portion of the cycle 50, the vehicle comes stop, i.e., vehicle speed=0 ($V_{veh}$=0), as indicated by the stop signal. After a predetermined period of time (x seconds), the engine is stopped if stop enablement conditions are met. In the illustrated embodiment, the following stop enablement conditions must be met before a stop/start cycle is initiated:

Stop/Start functionality is enabled (operator switch).
Brake is pressed.
Clutch is released.
The battery charge is sufficient such that leaving the engine on to charge the battery is not more desirable than initiating a stop/start cycle.
Engine coolant temperature ($T_c$)>Lower Limit ($T_{min}$)
$T_c$<Upper Limit ($T_{max}$).
$V_{veh}$=0 mph.
$V_{eng}$≤700 rpm.

When the stop enablement conditions are met, the automatic stop portion of the stop/start cycle is initiated. As shown in FIG. 1, it takes approximately 4 seconds after the automatic stop is initiated for the engine to come to a complete stop, i.e. $V_{eng}$=0.

With the stop portion of the stop/start cycle 50 has been completed, the engine remains off until the following start enablement conditions are met:

Stop/Start functionality is enabled (operator switch).
Stop/start cycle in progress (cycle stopped engine and is responsible for restart).
$V_{veh}$=0 mph.
$V_{eng}$=0 rpm.
Clutch pressed or accelerator pressed or steering wheel slightly rotated.

Thus, the automatic start portion of the stop/start cycle is initiated when a number of vehicle operating parameters are met in conjunction with an operator input. More specifically, with (1) the stop/start functionality enabled, (2) a stop/start cycle in progress (cycle stopped engine and is responsible for restart), (3) $V_{veh}$=0 mph, and (4) $V_{eng}$=0 rpm, the automatic start portion will begin upon operator input. In the illustrated embodiment, the operator input can be pressing the clutch, pressing the accelerator, or rotating the steering wheel slightly. Once initiated, the automatic start portion of the stop/start cycle starts the engine in a normal manner, i.e., engaging a starter motor with the engine to turn the engine, activating the fuel injection system, and sequentially providing a spark to each cylinder to ignite the air/fuel mixture in that cylinder (for engines that utilize spark plugs).

As noted, the stop/start cycle shown in FIG. 1 requires that the engine be completely stopped ($V_{eng}$=0) before the start portion of the stop/start cycle can begin. In circumstances in which the engine has not yet come to a complete stop, this requirement can cause a delay between the time that an operator provides input to initiate the start portion of the stop/start cycle and the time that the start portion actually begins.

Figure 2:
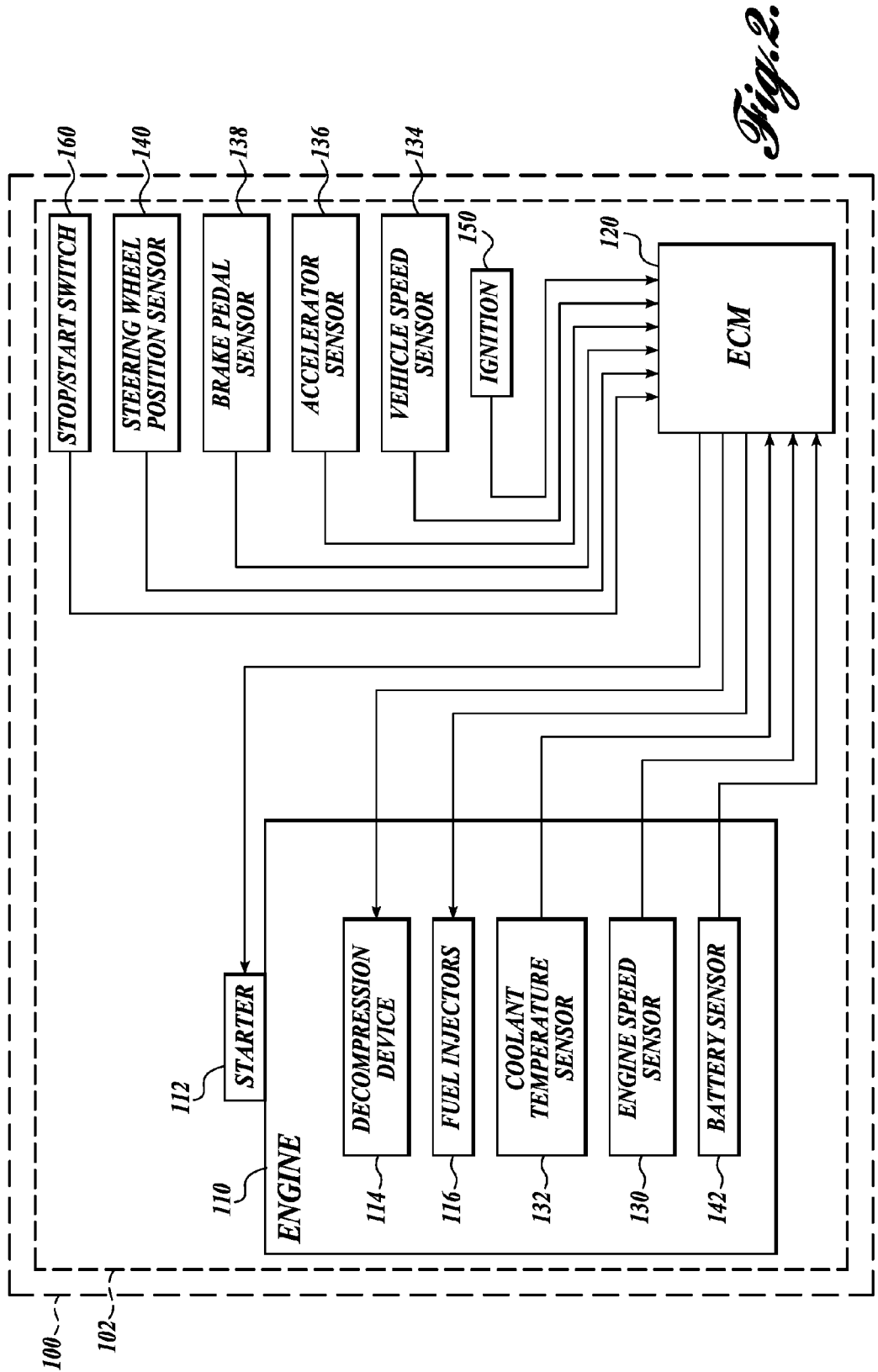
FIG. 2 shows a partial schematic diagram of a vehicle with a representative embodiment of a stop/start system according to the present disclosure.

Referring now to FIG. 2, a schematic diagram of a vehicle 100 with a representative embodiment of a stop/start system 102 according to the present disclosure is shown. The vehicle 100 includes an engine 110, which in the illustrated embodiment is a diesel engine for a heavy duty truck; however, it will be appreciated that the disclosed system is not limited to heavy duty trucks or diesel engines. In this regard, the vehicle can be any type of vehicle, and the engine can be any internal combustion engine.

The engine 110 includes fuel injectors 116 to provide fuel to the engine cylinders during operation. The engine further includes a variety of sensors, including a coolant temperature sensor 132 for sensing the temperature of the engine coolant, an engine speed sensor 130 for sensing engine speed, and a battery status sensor 142 for sensing the charge of the battery. In addition to the sensors and devices associated with the engine 110, the system 102 includes sensors and switches to sense and control various other operational characteristics of the vehicle 100. As shown in FIG. 2, the system 102 further include a stop/start switch 160 to allow an operator to engage or disengage the system 120, a vehicle speed sensor 134, an accelerator sensor 136, a brake pedal sensor 138, a steering wheel position sensor 140, and an ignition switch 150.

The engine 110 can further include a decompression device 114. The decompression device 114 is selectively activated to decompress the cylinders of the engine 110 by opening the intake or exhaust valve for each cylinder. Such devices are known and are typically used during startup to reduce the load on the starter 112. With the decompression device 114 activated, instead of compressing air within the cylinders, the pistons reciprocating within the cylinders move air in and out of the cylinders through the open valves. In this manner, the decompression device 114 reduces the resistance on the reciprocating cylinders, thereby reducing the load on the starter during engine startup. With the decompression device 114 deactivated, the valves open and close according normal engine operating timing.

Although the illustrated engine 110 includes a decompression device 114, it is contemplated the embodiments of the disclosed stop/start system 102 can also be utilized on engines that do not include a decompression device, and such variations should be considered within the scope of the present disclosure. For engines that include a decompression device, it takes approximately 4 seconds for the engine to come to a complete stop. In contrast, engines that do no utilize a decompression device stop much more quickly due to the resistance provided by the gases in the cylinders.

The vehicle 110 further includes a starter 112 that is configured to selectively engage the engine 110 during the engine startup. The starter 112 is a known starter that turns the engine 110 during startup to bring the engine to an operating speed, after which the starter disengages from the engine.

Still referring to FIG. 2, the vehicle 100 has an engine control module 120 (ECM) 120 that controls various aspects of the engine (fuel delivery, etc.). The ECM 120 may include a processor, a memory, an I/O interface suitably interconnected via one or more buses, including but not limited to a Controller Area Network (CAN) bus. The memory may include read only memory (ROM), such as programmable ROM (PROM), an erasable programmable ROM (EPROM), and an electrically erasable PROM (EEPROM), etc., random access memory (RAM), and storage memory, such as a solid state hard drive, flash memory, etc. As used herein, the term processor is not limited to integrated circuits referred to in the art as a computer, but broadly refers to a microcontroller, a microcomputer, a microprocessor, a programmable logic controller, an application specific integrated circuit, and other programmable circuits, among others.

Various components of the engine 110 are in communication with an engine control module 120 (ECM). In the illustrated embodiment, the ECM 120 receives signals from the engine speed sensor 130 and the coolant temperature sensor 132 regarding the engine speed and coolant temperature, respectively. The ECM 120 is also in communication with the starter 112, the decompression device 114 and the fuel injectors 116 in order to affect these control the operation of these and other components. It will be appreciated that the ECM 120 may receive data from other sensors (not shown) indicative of engine operating parameters, etc., in order to affect appropriate timing and duration of fuel delivery, valve actuation, etc. The ECM 120 may also receive data generated directly or indirectly from operator inputs.

Figure 3:
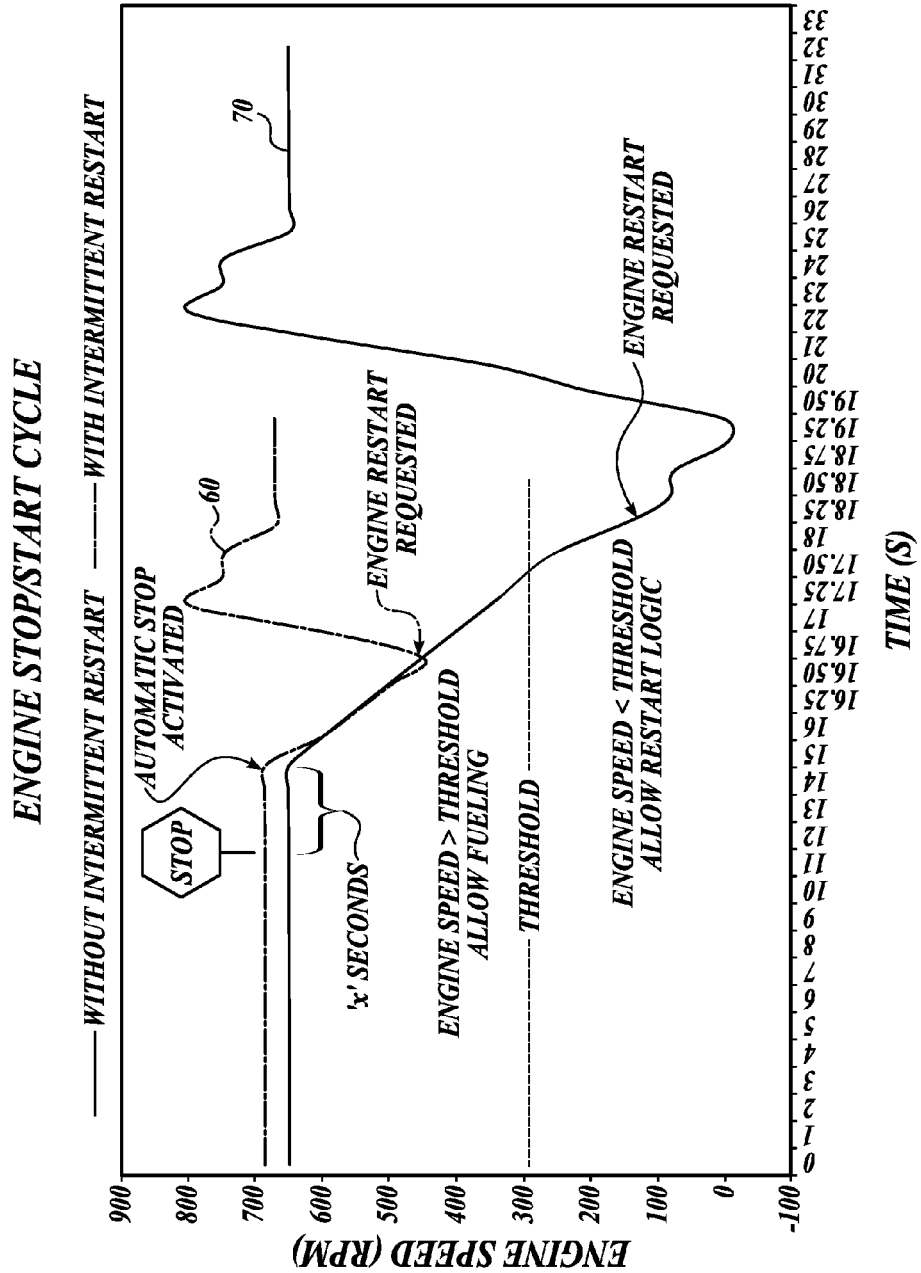
FIG. 3 shows first and second exemplary stop/start cycles performed by the stop/start system of FIG. 2.

FIG. 3 shows a first exemplary stop/start cycle 60 and a second exemplary stop/start cycle 70 that can result from the presently disclosed stop/start method 200. More specifically, FIG. 3 shows a plot of engine speed vs. time during the first stop/start cycle 60, in which an intermittent restart is initiated, and a second stop start cycle 70, in which an intermittent restart is requested but restart is delay.

Both stop/start cycles 60 and 70 being in a manner similar to the stop/start cycle 50 of FIG. 1. That is, the vehicle comes stop, i.e., vehicle speed=0 ($V_{veh}$=0), as indicated by the stop signal. After a predetermined period of time (x seconds), engine shutdown is initiated if stop enablement conditions are met. In the illustrated embodiment, the time x is approximately 4 seconds, but it will be appreciated that this time can be more or less than 4 seconds, and such variations should be considered within the scope of the present disclosure.

The enablement conditions of the present embodiment include the following:

The stop/start functionality is enabled by the operator via an operator input switch. Other embodiments are contemplated in which stop/start functionality is enabled by default and may or may not be selectively disabled by the operator.

The brake is depressed.

The clutch is released, which allows a restart request to be initiated by depressing the clutch, as detailed below.

The battery charge is sufficient such that leaving the engine on to charge the battery is not more desirable than initiating a stop/start cycle.

The coolant temperature ($T_c$) is within a predetermined range ($T_{min}$–$T_{max}$). When $T_c < T_{min}$, it is preferable to leave the engine running to bring $T_c$ up to full operating temperature. When $T_c > T_{max}$, the engine is in an overheating condition in which it is preferable to leave the engine running in order to prevent localized boiling of the coolant.

Engine speed is less than or equal to a predetermined maximum speed ($V_{stop\_max}$) at which a stop/start cycle can be initiated. When $V_{eng} > V_{stop\_max}$, it is likely that a load is on the engine, and it would be undesirable to shut the engine off when it is under additional load.

It will be appreciated that stop enablement conditions are exemplary, and various other conditions and combinations of conditions may be utilized. In this respect, the described conditions are should not be considered limiting.

With the enablement conditions met, the automatic stop is activated. As part of the stop sequence, the ECM 120 controls the engine 102 to stop fuel delivery to cylinders via the fuel injectors 116. This can be accomplished by shutting off the fuel pump, closing a valve between the fuel pump and the fuel injectors, or any other suitable means. The ignition preferably stays on during the automatic stop; however, it embodiments are contemplated in which the ignition is turned off upon shutdown and turned on during restart.

In addition to shutting off the supply of fuel to the cylinders, the automatic stop also includes activating the decompression device 114. With the decompression device activated, the inlet or exhaust valves on the cylinders are open, and load on the engine is reduced significantly. As a result, engine vibration during shutdown is reduced.

Still referring to FIG. 3, the disclosed system 102 provides for intermittent restart. As used herein, "intermittent restart" is a restart requested and initiated before the engine has come to a complete stop, i.e., when $V_{eng} > 0$. In the disclosed system 102, an intermittent restart is initiated when an engine restart is requested while the engine speed is still greater than a predetermined threshold. In the illustrated embodiment, the predetermined threshold is approximately 300 rpm, however it will be appreciated that the threshold can be higher or lower than the illustrated embodiment, and systems employing different thresholds should be considered within the scope of the present disclosure.

Referring specifically to stop/start cycle 60 shown in FIG. 3, the engine restart is requested when the engine speed is above the threshold value. In the illustrated embodiment, the engine restart request is initiated by the driver. The request can be initiated by turning the steering wheel slightly, pressing the clutch, pressing the brake pedal, or by any other suitable action performed by the operator. The request can also be initiated by two or more of these actions being performed simultaneously or in a particular sequence. One of ordinary skill in the art will appreciate that any number of different operator actions can be incorporated to signal a restart request.

Upon initiation of the intermittent restart, the decompression device 102 is deactivated. As a result, the intake and exhaust valves open and close according to the normal engine operating sequence. In addition, the ECM 120 controls the engine 102 to restart fuel delivery to cylinders via the fuel injectors 116. For a diesel engine, the heat of compression in the cylinders ignites the fuel delivered to the cylinder, the engine 102 restarts, and normal vehicle operation resumes. It will be appreciated that for gasoline powered engines, the intermittent restart may also include restarting a sparking sequence to initiate combustion in the cylinders. These and other modifications to account for different engine restart parameters are contemplated and should be considered within the scope of the present disclosure.

For the stop/start cycle 70 shown in FIG. 3, the engine restart is requested while the engine is still rotating, but is below the threshold speed, i.e. $V_{threshold} > V_{eng} > 0$. Because the engine speed is too low to restart the engine without the use of a starter, the automatic start sequence restarts the engine according to a normal start sequence.

During a normal start sequence, the decompression device 114 is activated (or remains activated). The starter 112 engages the engine and turns the engine 110 to a start speed.

With the engine 110 turning at a start speed, the decompression device 114 is deactivated so that the intake and exhaust valves open and close according to the normal engine operating sequence. The ECM 120 also controls the engine 110 to restart fuel delivery to cylinders via the fuel injectors 116. As previously noted, the ignition remains on throughout the stop/start cycle. As a result, upon deactivation of the decompression device 114 and restarting of the fuel delivery to the engine 110, the engine starts, and the starter 112 disengages from the engine.

Although the illustrated embodiment shows only one engine threshold speed ($V_{threshold}$), above which the starter 112 is not utilized for an automatic start sequence, and below which the starter is utilized for an automatic start sequence, it will be appreciated that alternate embodiments are possible in which two engine threshold speeds are utilized. For example, one alternate embodiment of a stop/start system may have an upper engine threshold speed and a lower engine threshold speed. The upper engine threshold speed is similar to the previously described single threshold, above which the starter 112 is not utilized during an automatic start sequence. The lower engine threshold speed is an engine speed above which the starter is not utilized for an automatic start sequence, nor is simply providing fuel to the engine sufficient to restart the engine. Below the lower engine threshold speed, the starter is utilized during an automatic start sequence. Thus, when the engine speed is between the upper and lower engine threshold speeds, an automatic restart is not initiated. Instead, the system waits for the engine speed to drop below the lower engine threshold speed and then initiations an automatic restart sequence using the starter. The use of two thresholds allows for a the starter to be engaged at a lower engine speed than that at which the engine cannot be restarted without the use of a starter. This prevents the starter from being engaged in the "death zone," i.e., when the engine speed is higher than a speed at which the starter can be utilized without putting undue wear on the vehicle's drivetrain.

It will be appreciated that in yet another embodiment, the lower engine threshold speed can be 0 rpm, i.e., if the engine speed is below the upper engine threshold speed the starter 112 is not utilized for an automatic start sequence. If the engine speed is below the upper engine threshold speed, but the engine has not come to a complete stop, the automatic restart sequence will not begin until the engine stops. Such an embodiment is an improvement over known systems in that there is a time after an automatic stop is initiated that a restart is still possible before the engine comes to a complete stop. These and other variations to the engine speed threshold(s) are contemplated and should be considered within the scope of the present disclosure.

If an engine restart is not requested until after the engine stops ($V_{eng}=0$), then the automatic restart occurs in a manner similar to that of the previously described stop/start cycle 50 shown in FIG. 1.

Current stop/start systems, require that the engine comes to a complete stop before a restart sequence is initiated. That is, there is a period of time as the engine comes to a stop during which the engine restart cannot be initiated. In contrast, the presently disclosed stop/start system 102 allows for an intermittent restart to be initiated during at least a portion of the period of time during which the engine comes to a stop. As a result, the time during which the restart cannot be initiated is reduced.

Figure 4:
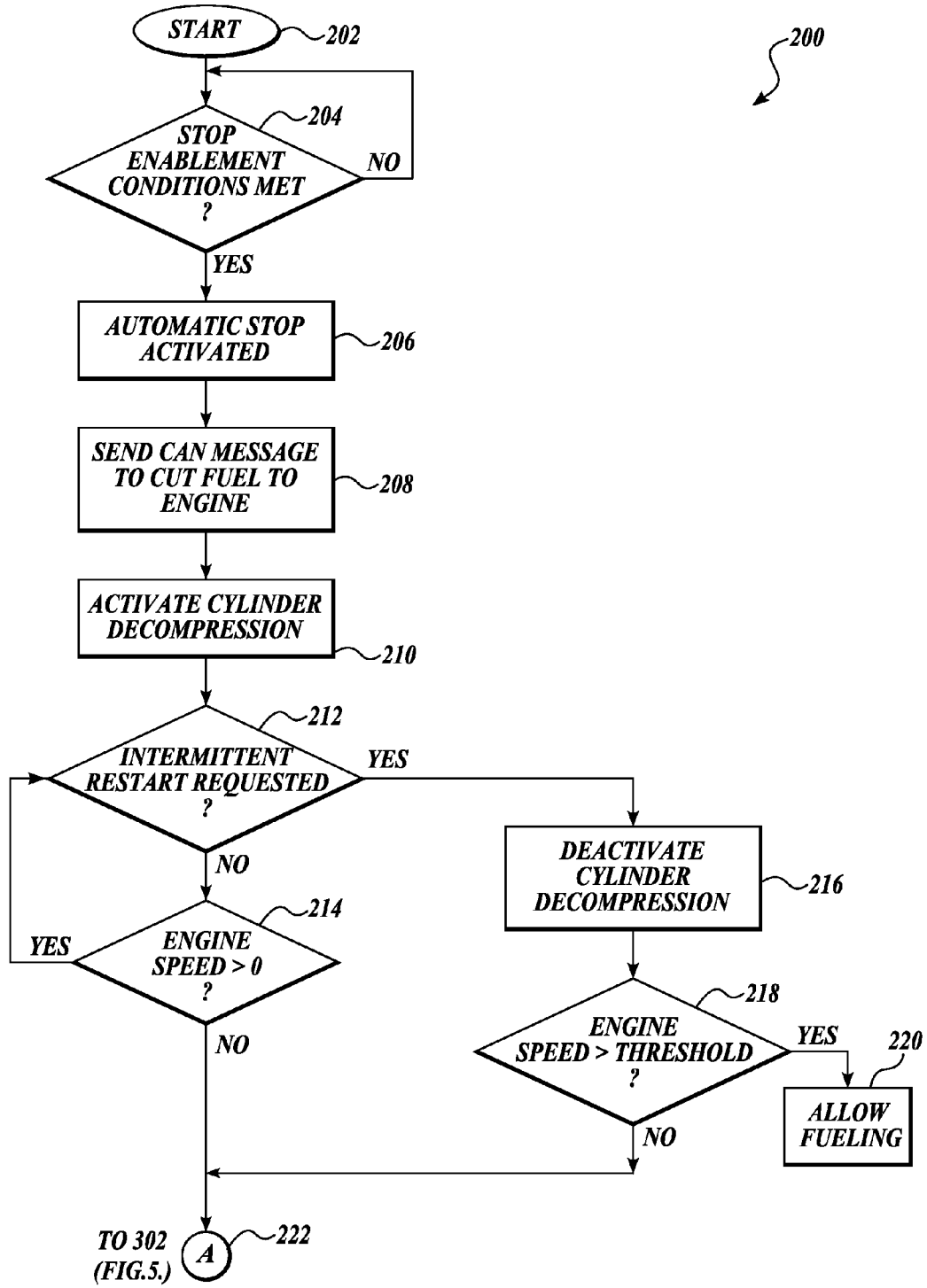
FIG. 4 shows a schematic diagram of a first portion of a stop/start method performed by the stop/start system of FIG. 2.
Figure 5:
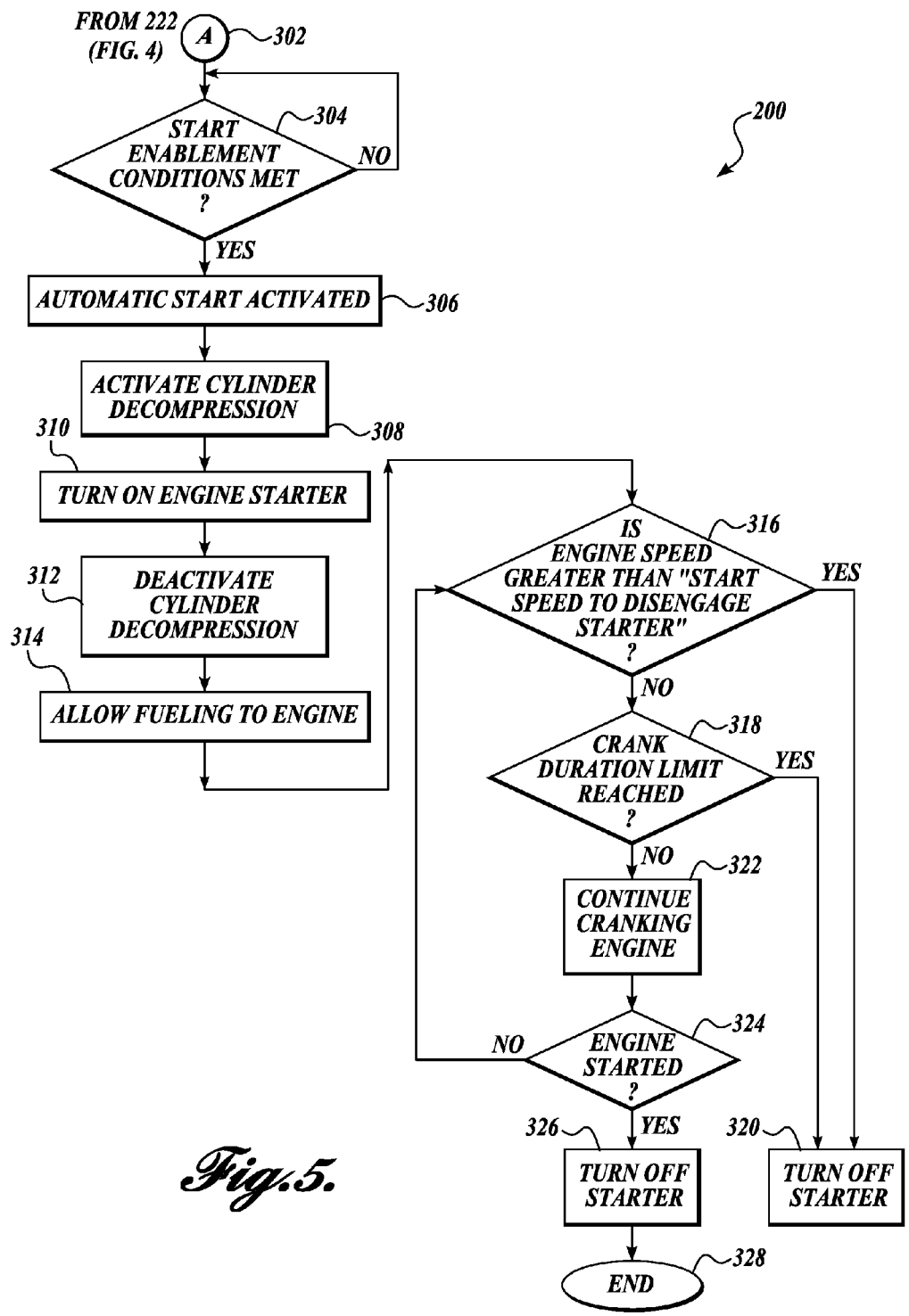
FIG. 5 shows a schematic diagram of a second portion of a stop/start method performed by the stop/start system of FIG. 2.

Referring now to FIGS. 4 and 5, an representative method 200 for executing a stop/start cycle will now be described. As shown in FIG. 4, the method 200 starts at block 202 and proceeds to block 204, in which it is determined whether or the enablement conditions of automatic stop have been met. If the enablement conditions have not been met, the method 200 waits until the enablement conditions have been met. When the enablement conditions of the automatic stop have been met, the method 200 proceeds to block 206, and the automatic stop is activated.

With the automatic stop activated, the method 200 proceeds to block 208, and the fuel supply to the engine is cut off. The method 200 then moves to block 210, in which the decompression device 114 is activated, and the intake or exhaust valves for each cylinder are held open.

The method 200 next proceeds to block 212, and it is determined whether an intermittent restart is requested. If an intermittent restart is not requested, the method proceeds to block 214, wherein the engine speed is checked. If the engine speed is greater than 0, then the method 200 returns to block 212. If the engine speed is not >0, then the method proceeds through block 222 and block 302 (FIG. 5) to block 304.

Referring back to block 212, if an intermittent restart is requested, then the method 200 moves to block 216. In block 216, the decompression device is deactivated, and the valves operate according to a normal engine operating sequence. The method 200 next proceeds to block 218, wherein engine speed is compared to the threshold value. If the engine speed is greater than the threshold value, then the method 200 proceeds to block 220. In block 220, fueling is enabled, and the engine restarts. If the engine speed is less than the threshold value then the method 200 proceeds through block 222 and block 302 (FIG. 5) to block 304.

Referring now to FIG. 5, with the engine stopped, the method 200 remains at block 304 until the restart enablement conditions are met. When the restart enablement conditions are met, the method 200 moves to block 306, and the automatic start is activated. The method 200 proceeds to block 308, in which the decompression device is activated, and then to block 310, in which the starter engages the engine to rotate the engine to a start speed. The decompression device is deactivated in block 312, and then in block 314, fuel is delivered to the engine.

At block 316, the engine speed is compared to a speed at which the starter is disengaged from the engine. If the engine speed is greater than this disengagement speed, the method 200 proceeds to block 320, and the starter is disengaged from the engine and turned off. If the engine speed is not greater than the disengagement speed, then the method 200 proceeds to block 318.

In block 318, it is determined whether the engine cranking time has reached a predetermined limit. If the limit has been reached, the method 200 proceeds to block 320, and the starter is disengaged from the engine and turned off. If the limit has not been reached, then the method 200 continues to block 322 and the engine cranking continues.

Next, the method 200 proceeds to block 324, in which it is determined if the engine is started. If the engine has not started, the method 200 returns to block 316 to continue the engine startup. If the engine has started, the method 200 moves to block 326, where the starter disengages the engine and is turned off. With the engine started and the starter turned off, the method 200 proceeds to block 328 and ends.

While illustrative embodiments have been illustrated and described, it will be appreciated that various changes can be made therein without departing from the spirit and scope of the invention.

The embodiments of the invention in which an exclusive property or privilege is claimed are defined as follows:

1. A stop/restart system for a vehicle, comprising:
   (a) a vehicle having an engine;
   (b) an engine speed sensor configured to sense engine speed;
   (c) a controller configured to receive signals from the engine speed sensor and to control delivery of fuel to the engine, wherein the controller is programed to:
      (i) determine if a stop/start enablement condition has been met;
      (ii) initiate an engine shutdown; and
      (iii) initiate an intermittent engine restart in response to a restart request made when engine speed>0.

2. The system of claim 1, wherein the controller is programmed to stop a fuel supply to the engine during the step initiating an engine shutdown.

3. The system of claim 2, wherein the controller is programmed to activate a decompression device to decompress at least one cylinder of the engine during the step of initiating an engine shutdown.

4. The system of claim 2, wherein the controller is programmed to compare an engine speed to a predetermined engine speed threshold during the step of initiating an intermittent engine restart.

5. The system of claim 4, wherein the controller is programmed to restore the fuel supply to the engine if the engine speed is greater than the engine speed threshold.

6. The system of claim 4, wherein the controller is programmed to wait until the engine speed=0 if the restart request is made when the engine speed is less than the engine speed threshold.

7. A method of automatically stopping and restarting a vehicle engine, comprising the steps of:
   (a) determining if a stop/start enablement condition has been met;
   (b) initiating an engine shutdown; and
   (c) initiating an intermittent engine restart in response to a restart request made when engine speed>0.

8. The method of claim 7, wherein the step initiating an engine shutdown comprises stopping a fuel supply to the engine.

9. The method of claim 8, wherein the step initiating an engine shutdown further comprising activating a decompression device to decompress at least one cylinder of the engine.

10. The method of claim 9, wherein the step of initiating an intermittent engine restart comprises comparing an engine speed to a predetermined engine speed threshold.

11. The method of claim 10, wherein predetermined engine speed threshold is 300 rpm.

12. The method of claim 10, wherein the step of initiating an intermittent engine restart further comprises restoring the fuel supply to the engine if the engine speed is greater than the engine speed threshold.

13. The method of claim 12, further comprising the step of waiting until the engine speed=0 before initiating an engine restart if the restart request is made when the engine speed is less than the engine speed threshold.

14. The method of claim 12, wherein the step of initiating an intermittent engine restart further comprises deactivating the decompression device.

15. The method of claim 8, wherein the step of initiating an intermittent engine restart comprises comparing an engine speed to a predetermined engine speed threshold.

16. The method of claim 15, wherein the step of initiating an intermittent engine restart further comprises restoring the fuel supply to the engine if the engine speed is greater than the engine speed threshold.

17. The method of claim 16, further comprising the step of waiting until the engine speed=0 before initiating an engine restart if the restart request is made when the engine speed is less than the engine speed threshold.

18. The method of claim 7, wherein the restart request is made by an operator at least one of pressing a clutch, pressing an accelerator, and turning a steering wheel.

19. The method of claim 7, wherein a vehicle ignition remains on during engine shutdown.

\* \* \* \* \*

UNITED STATES PATENT AND TRADEMARK OFFICE
CERTIFICATE OF CORRECTION

PATENT NO. : 9,957,941 B1  
APPLICATION NO. : 15/341320  
DATED : May 1, 2018  
INVENTOR(S) : M. D. Gerty et al.

Page 1 of 1

It is certified that error appears in the above-identified patent and that said Letters Patent is hereby corrected as shown below:

In the Claims

| Column | Line | Error |
|---|---|---|
| 9 (Claim 1, Line 7) | 7 | "programed" should read --programmed-- |

Signed and Sealed this  
Ninth Day of July, 2019

Andrei Iancu  
*Director of the United States Patent and Trademark Office*